United States Patent [19]
Haworth et al.

[11] 4,060,294
[45] Nov. 29, 1977

[54] WALL PANEL WITH PREWIRED POWER SYSTEM

[75] Inventors: Richard G. Haworth, Holland; Charles J. Saylor, Zeeland; Harold R. Wilson, Holland, all of Mich.

[73] Assignee: Haworth Mfg., Inc., Holland, Mich.

[21] Appl. No.: 615,506

[22] Filed: Sept. 22, 1975

[51] Int. Cl.² ........................................... H01R 39/00
[52] U.S. Cl. ......................................... 339/4; 52/70; 52/221; 52/239; 160/135; 339/22 R
[58] Field of Search ............................ 339/4, 20-24; 52/70, 71, 122, 221, 239, 758 M, 220; 160/135

[56] References Cited

U.S. PATENT DOCUMENTS

| | | | |
|---|---|---|---|
| 1,718,252 | 6/1929 | Putnam | 52/220 |
| 1,718,253 | 6/1929 | Putnam | 52/220 |
| 1,744,040 | 1/1930 | Elzer | 339/4 |
| 2,000,243 | 5/1935 | Manske | 52/220 |
| 2,039,982 | 5/1936 | Schaller | 52/221 |
| 2,608,634 | 8/1952 | Abbott | 339/22 R |
| 2,748,359 | 5/1956 | Swan | 339/28 |
| 2,808,136 | 10/1957 | Hammitt et al. | 52/220 |
| 3,195,698 | 7/1965 | Cordrea | 52/221 |
| 3,529,389 | 9/1970 | Wilkins | 52/221 |
| 3,762,116 | 10/1973 | Anderson et al. | 52/239 |
| 3,877,191 | 4/1975 | Munsey | 52/239 |

Primary Examiner—Joseph H. McGlynn
Attorney, Agent, or Firm—Blanchard, Flynn, Thiel, Boutell & Tanis

[57] ABSTRACT

A portable, prefabricated panel adapted to be connected with a plurality of similar panels to form a wall or partition structure. The panel is electrically prewired and includes electrical power blocks disposed adjacent the opposite lower corners of the panel, which power blocks are connected by electrical cables which extend internally of the panel. When two or more panels are connected together, electrical power is transmitted between each adjacent pair of panels by a flexible electrical connector which plugs into the power blocks of the adjacent panels. The panel also has electrical sockets integrally associated therewith, which sockets are preferably associated with the power blocks. The power blocks are symmetrical so that the same electrical connections can be made on either side of the panel. A channel-like raceway extends along the bottom edge of the panel for permitting the hidden storage of communication cables. The panel preferably has a rectangular frame formed from hollow channellike members which define an interior path around the complete periphery of the panel to facilitate the feeding of cables and conduits along the vertical or horizontal edges of the panel.

46 Claims, 22 Drawing Figures

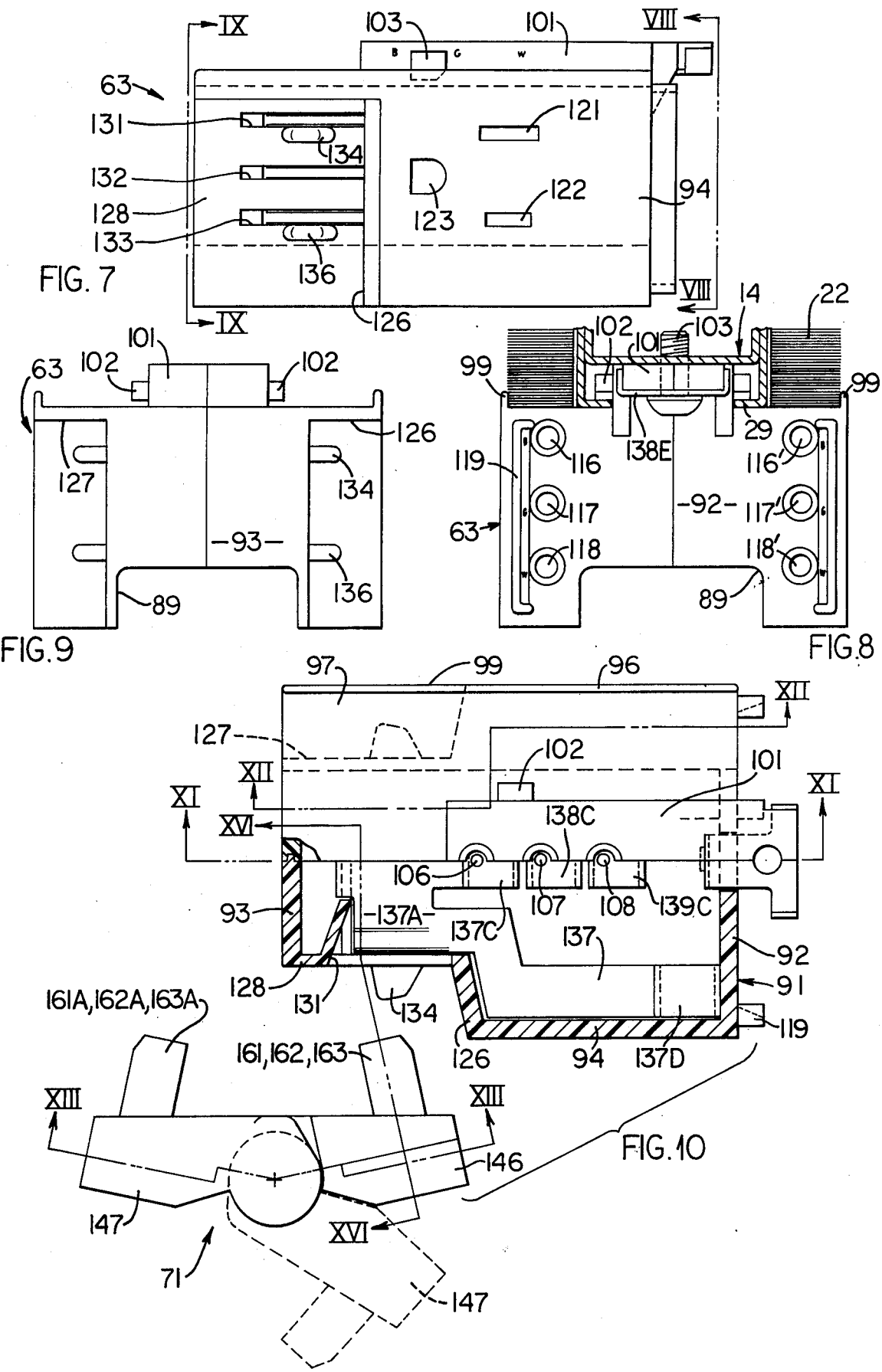

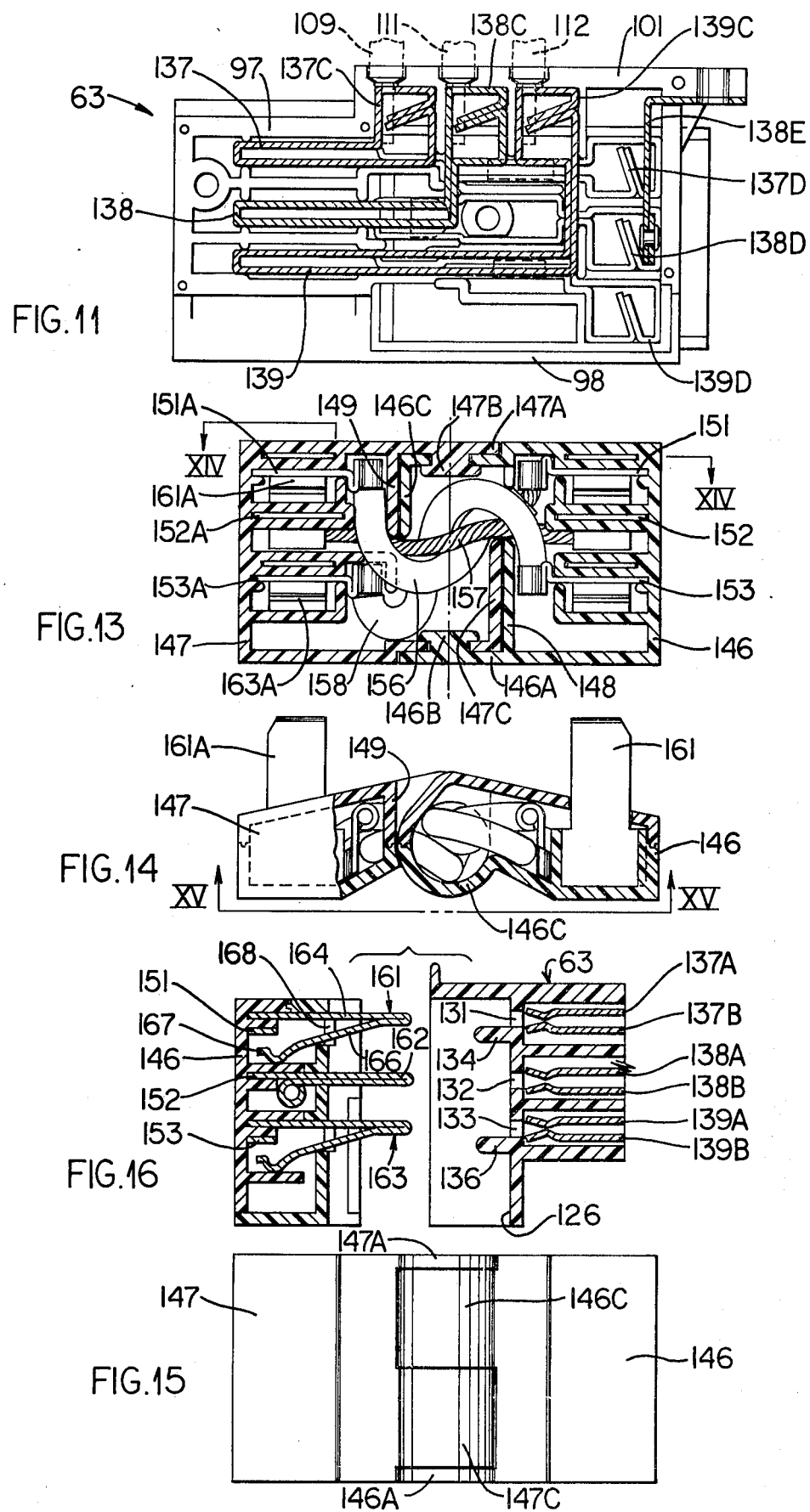

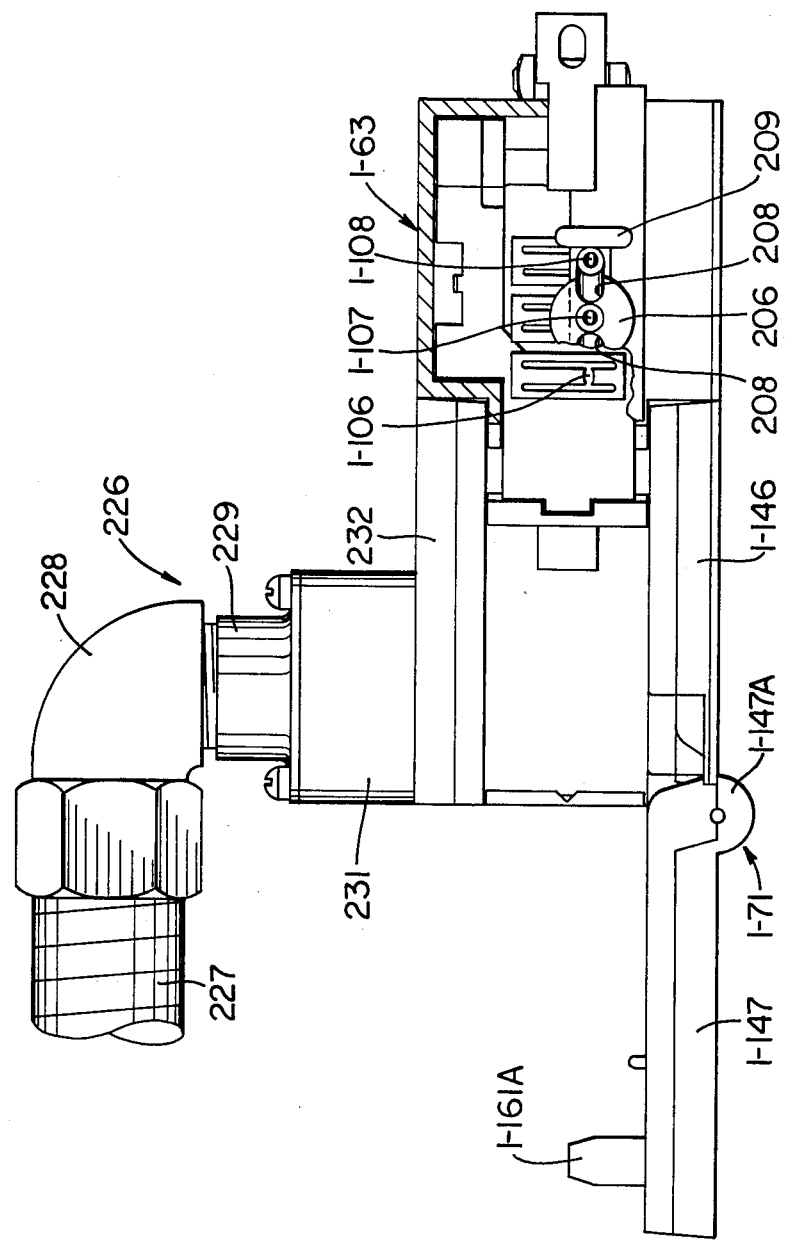

WALL PANEL WITH PREWIRED POWER SYSTEM

FIELD OF THE INVENTION

The present invention relates to a wall or space divider structure which is built up of a plurality of prefabricated panels and, in particular, to an improved panel which is electrically prewired to facilitate the supplying of electrical energy to the regions bounded by the panels.

BACKGROUND OF THE INVENTION

Wall structures formed from a plurality of prefabricated panels are used extensively in commercial and industrial buildings for dividing interior regions of the building into smaller working spaces. Such structures have proven particularly effective in providing greater privacy, while additionally minimizing noise. The panels are provided with many different exterior finishes, such as colored plastics, carpets and fabrics, so that the panels can be used to improve the interior decor. These panels also provide maximum flexibility since they can be readily assembled or disassembled and moved about whenever a rearrangement of the available space is desired.

While wall structures employing such prefabricated panels have proven highly desirable for the numerous reasons set forth above, nevertheless these structures have long created a problem with respect to the electrical and communication cables used to service the spaces defined by the wall structures. The wall structures formed from such panels have required that auxiliary raceways be mounted on the front of the panels for accommodating the power and communication cables. However, these auxiliary raceways have proven undesirable since they project outwardly from the front of the panels and thus destroy the appearance of the wall structure. These outwardly projecting raceways also prevent office equipment from being located directly adjacent the wall panel, and also constitute undesirable dust and dirt collectors.

In addition, these auxiliary raceways require that the electrical wiring be totally installed after the wall structure has been assembled in the desired location. This thus requires substantial time on the part of an electrician so as to accomplish the desired electrical installation, and accordingly greatly increases the cost of the installation. Further, when movement of the wall structure is desired, such as by disassemblying some or all of the panels and then reassemblying same in a new location or orientation, it is necessary to have an electrician disconnect the power cables prior to disassembly, and then reinstall the power cables after the wall panels have been reassembled. These auxiliary power raceways have thus greatly restricted the flexibility and hence the desirability of wall structures of this general type.

While attempts have been made to provide prefabricated wall panels with electrical sockets incorporated therein, nevertheless these prefabricated panels have not been totally prewired in a manner so as to permit a plurality of such panels to be readily connected or disconnected in a simple and efficient manner without requiring an electrician to either install or remove the power cables.

Accordingly, it is an object of the present invention to provide:

1. An improved wall or partition structure formed from a plurality of prefabricated panels releasably joined together, which prefabricated panels are individually electrically prewired to facilitate the supplying of electrical energy to the regions bounded by the wall structure.

2. A wall structure, as aforesaid, wherein a plurality of said prefabricated panels can be readily connected together, both mechanically and electrically, without requiring any complex external wiring.

3. A wall structure, as aforesaid, wherein each prefabricated panel is individually prewired and has power connectors located adjacent the opposite ends thereof, whereby a plurality of adjacent panels can be easily electrically connected by a flexible electrical connector.

4. A wall structure, as aforesaid, wherein the power connectors are fixedly associated with the panel and disposed adjacent the opposite lower corners thereof, and wherein the flexible electrical connector includes plug portions adapted to coact with socket portions formed on the power connectors of two adjacent panels for electrically interconnecting the adjacent panels.

5. A wall structure, as aforesaid, wherein the panel includes a raceway fixedly associated therewith and extending along the lower edge thereof, which raceway accommodates therein electrical cables which extend between and electrically connect the power connectors disposed adjacent the opposite lower corners of the panel.

6. A wall structure, as aforesaid, wherein the raceway has a space therein for accommodating communication cables to facilitate the mountng of these cables along the wall structure.

7. A wall structure, as aforesaid, wherein the power connector comprises a power block having a conventional electrical socket associated therewith, which socket opens outwardly from both sides of the panel so as to accommodate a conventional electrical plug.

8. A wall structure, as aforesaid, wherein the flexible electrical connector permits relative swinging movement between two adjacent wall panels, and hence between the connected power connectors, so that the wall panels can be angularly oriented as desired.

9. A wall structure, as aforesaid, wherein the prefabricated panel has a rigid rectangular frame formed from channellike rails, which define a hollow passage extending completely around the panel so as to accommodate therein power or communication cables.

10. A wall structure, as aforesaid, which provides numerous electrical sockets integrally associated therewith to permit efficient utilization of electrical equipment within the spaces or regions bounded by the wall structure without having to resort to the use of extension cords and the like.

Other objects and purposes of the present invention will be apparent to persons familiar with systems of this type upon reading the following specification and inspecting the accompanying drawings.

BRIEF DESCRIPTION OF THE DRAWINGS

FIG. 7 is an enlarged side view of the power block.

FIG. 8 is a view along line VIII—VIII in FIG. 7.

FIG. 9 is an end view taken along line IX—IX in FIG. 7.

FIG. 10 is a top or plan view, partially in cross-section, of the power block and showing the flexible connector used for joining the power blocks of adjacent panels.

FIGS. 11, 12 and 13 are sectional views along lines XI—XI, XII—XII and XIII—XIII, respectively, in FIG. 10.

FIG. 14 is a sectional view of the flexible connector taken along the line XIV—XIV in FIG. 13.

FIG. 15 is a view taken along line XV—XV in FIG. 14.

FIG. 16 is a fragmentary sectional view as taken along line XVI—XVI in FIG. 10.

FIG. 22 is an enlarged top view of the power block associated with the embodiment of FIGS. 19-21.

Figure 1:
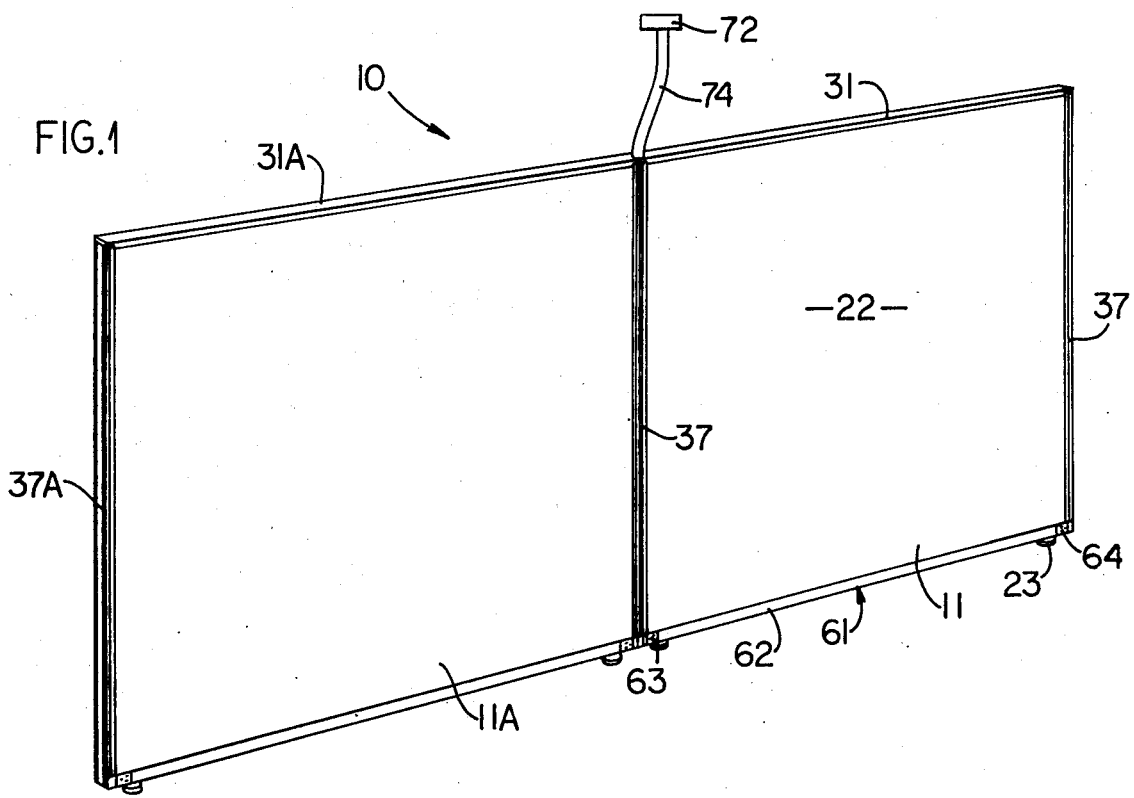
FIG. 1 is a perspective view of a wall or partition system formed from two prefabricated panels.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the panel and designated parts thereof. Said terminology will include the words specifically mentioned, derivatives thereof and words of similar import.

SUMMARY OF THE INVENTION

A plurality of prefabricated panels are selectively connected together to form a wall structure having a desired length and configuration. Adjacent panels are connected by a connecting element, such as a hinge, whereby adjacent panels can be aligned or angled relative to one another. Each panel has a raceway fixedly associated therewith and extending along the lower edge thereof, which raceway extends across the width of the panel and is substantially flush with the sidewalls thereof. The opposite ends of the raceway terminate in power blocks which are fixedly associated with the panel adjacent the opposite lower corners thereof. Each power block has a conventional socket associated with the opposite sides thereof to permit an electrical plug to be inserted therein. Electrical cables extend through the raceway and connect the power blocks at the opposite ends of the raceway. The power blocks of two adjacent panels are electrically connected by a flexible connector which includes a central hinge portion and two plug portions, which plug portions are insertable into the power blocks of adjacent panels for electrically interconnecting the panels while additionally permitting relative angular displacement between the panels. The power blocks can accommodate a flexible connector on either side of the panel, whereby a single panel can be electrically connected to two adjacent panels by connecting one side of the power block to one adjacent panel through a first flexible connector, and by connecting the other side of the power block to the other adjacent panel through a second flexible connector. The flexible connectors, like the power blocks, are substantially flush with the sidewalls of the panels so that the resulting wall structure, and specifically the individual panels, have a smooth and streamlined appearance. The individual panels are preferably formed with a hollow rectangular frame whereby the main power cable, which may extend downwardly from the ceiling, can be fed therethrough so as to be interconnected to one of the power blocks, thereby energizing all of the power blocks associated with the wall structure.

DETAILED DESCRIPTION

FIG. 1 illustrates therein a part of a wall structure or system 10 which is formed by a pair of substantially identical wall panels 11 and 11A. While only two wall panels have been disclosed in FIG. 1, it will be appreciated that any desired number of such panels can be connected together with the adjacent panels disposed in aligned or angled relationship relative to one another so as to provide for the desired orientation of the wall structure.

The panel 11 includes a rigid rectangular frame 12 (FIG. 2) formed by top and bottom rails 13 and 14, respectively, which rails in turn are joined by opposite side rails 16 and 17. A pair of thin facing sheets 18 and 19 are disposed on the opposite sides of the frame 12 and are suitably secured thereto, as by an adhesive. The facing sheets 18 and 19, which may be of sheet metal or pressed board, confine therebetween a honeycomb core 21 which occupies the region within the rectangular frame 12. The facing sheets 18 and 19 are additionally covered by a suitable exterior material, such as carpet 22.

The panel 11 also has a pair of adjustable feet 23 mounted on the bottom rail 14 and projecting downwardly therefrom for engagement with a supporting surface, such as the floor.

Figure 3:
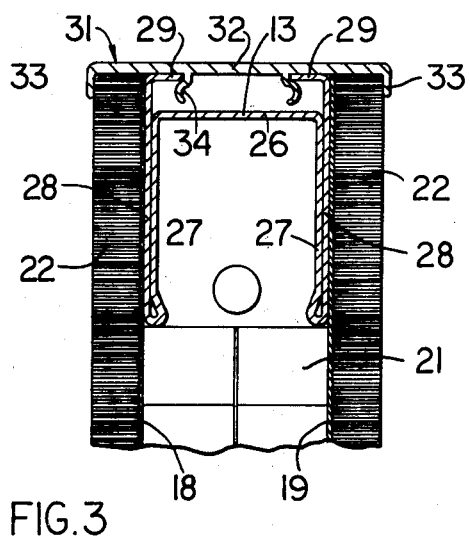
FIGS. 3-4 are enlarged, fragmentary cross-sectional views taken respectively along the lines III—III, IV—IV and V—V in FIG. 2.

The top rail 13 is of a substantially channel-shaped configuration and includes a base wall 26 (FIG. 3) which extends transversely across the width of the panel, and from which a pair of substantially parallel legs 27 project downwardly. A further pair of substantially parallel legs 28 project upwardly from the base wall 26 and terminate in inwardly directed flanges 29. The legs 28, in cooperation with the base wall 26, form a further channel-shaped configuration which opens in a direction opposite to the channel-shaped configuration formed by the end wall 26 and legs 27. The top rail 13 is, in the illustrated embodiment, formed with the legs 28 overlying the legs 27 and having their adjacent ends integrally connected, as by means of a bend, whereby the rail can be formed from a sheet material, such as from sheet aluminum.

The upper end of the top rail 13 is closed by a channel-shaped top cap 31 which extends longitudinally along the upper edge of the panel. The top cap 31 has a web portion 32 which bears on the flanges 29, and which terminates in downwardly projecting flanges 33 which overlap the upper corners of the carpet layers 22. The web 32 has a pair of spring clips 34 which resiliently engage the flanges 29 for fixedly but releasably coupling the top cap 31 to the top rail 13.

The side rails 16 and 17 are identical to the top rail 13 except that the side rails are additionally provided with a plurality of elongated slots 36 (FIGS. 5 and 6) formed therein, which slots are disposed within a row which extends centrally along the base wall 26 of the side rails.

Each side rail 16 and 17 has an end cap 37 (FIGS. 5 and 6) fixedly mounted thereon, which end cap 37 is of a channel-shaped cross-section and extends throughout the height of the panel. The end cap 37 has an exterior web or wall 38 which extends transversely across the width of the panel and is provided with a pair of grooves 39 formed adjacent the opposite edges thereof. These grooves 39 extend over a major portion of the length of the end cap. A center flange 41 is fixed to and projects inwardly from the web 38 and terminates in a plurality of downwardly directed, L-shaped hooks 42. The hooks 42 extend through the slots 36 formed in the side rails 16 and 17 whereby each end cap can be fixedly mounted on its respective side rail. In the illustrated embodiment, each hook 42 has a small recess 43 formed therein which accommodates a small dimple 44 formed in the base wall 26 of the side rail for fixedly but releasably mounting the end cap on the side rail.

Figure 5:
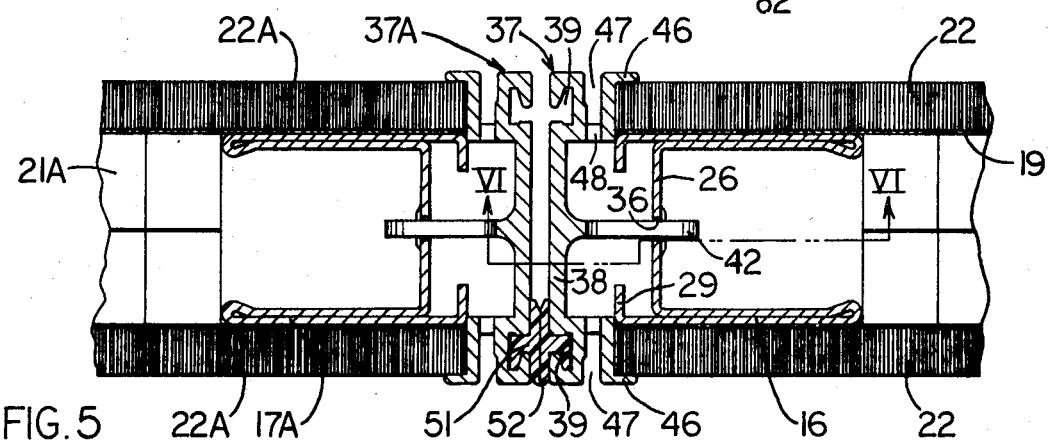
Figure 6:
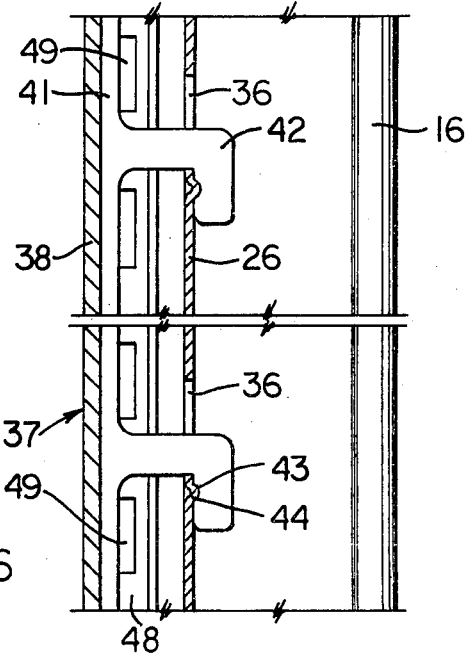
FIG. 6 is a fragmentary view, partially in cross-section, taken along the line VI—VI in FIG. 5.

End cap 37 also has a pair of L-shaped flanges 46 which are disposed rearwardly from the web 38 and are positioned for engagement with the flanges 29 formed on the side rails. The L-shaped flanges 46 also project outwardly so as to overlap the outer corners or edges of the carpet layers 22 as illustrated in FIG. 5. These flanges 46 are separated from the web 38 by intermediate grooves 47 which extend longitudinally of the end cap, and a wall or web 48 joins each flange 46 to the web 38. The wall 48 has a plurality of elongated slots 49 formed therethrough, which slots all communicate with the groove 47. The groove 47 and slots 49 accommodate therein brackets associated with auxiliary equipment which is to be mounted on the wall panel, which equipment may comprise file cabinets, bookshelves and the like. This equipment and the manner in which it is mounted on the wall panels of this general type is well-known, and thus further description of this structure is not believed necessary.

The elongated grooves 39 in the end cap 37 accommodate therein a part of a hinge member 51 which, as illustrated in FIG. 5, coacts with the end caps 37 and 37A of two adjacent panels for permitting the two panels to be connected together. The hinge member 51 includes a hinge 52 which permits the two wall panels to be selectively angularly displaced relative to one another. This hinge member 51 is preferably extruded from a plastic material, but can be replaced by other types of connecting elements or hinges if desired.

The bottom rail 14 is identical in structure to the top rail 13, described above, but is obviously oriented in the opposite direction.

Figure 2:
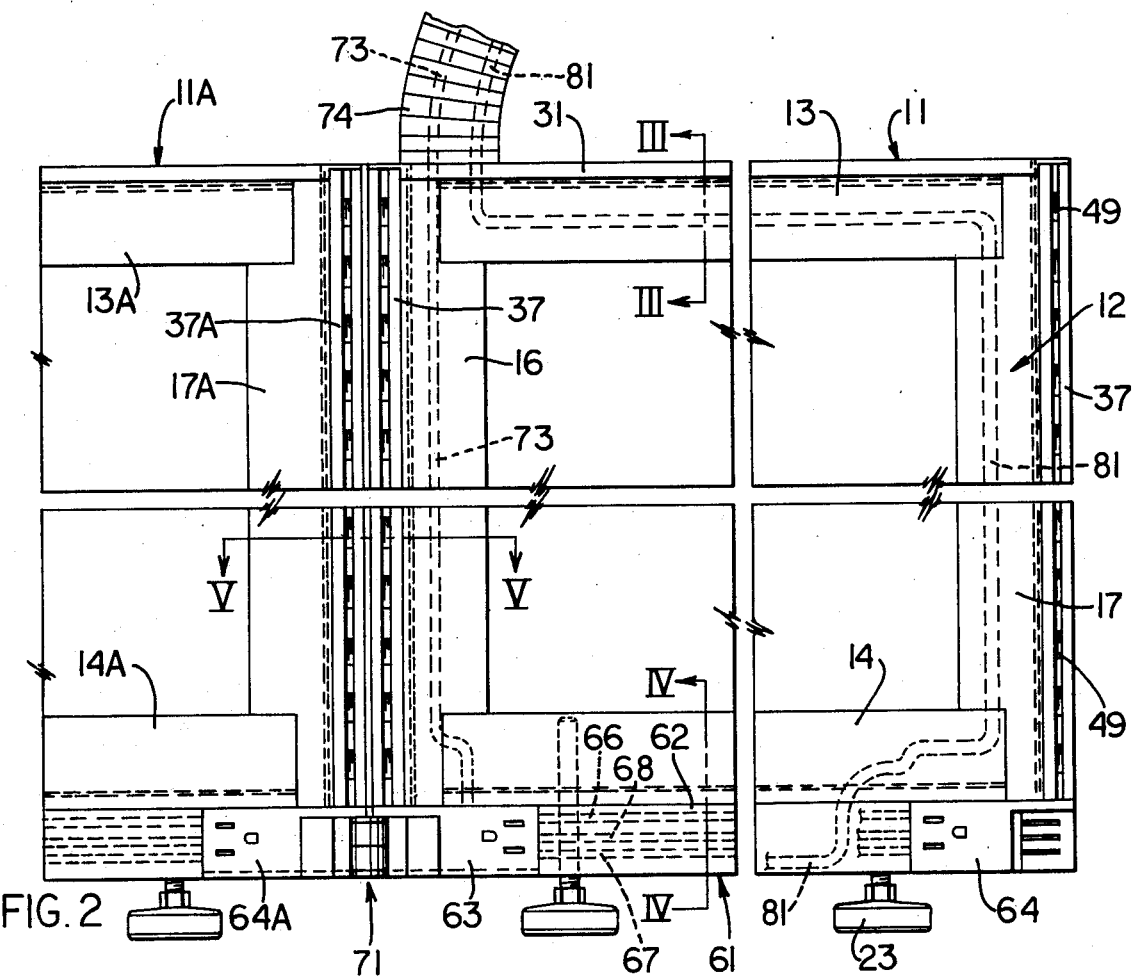
FIG. 2 is an enlarged fragmentary view of the panels illustrated in FIG. 1, the outer skins of the panels being removed to permit illustration of the interior panel structure.

According to the present invention, the panel 11 is provided with a pre-wired electrical system 61 (FIG. 2) associated therewith, which system includes an elongated raceway 62 fixed to the panel and extending longitudinally along the lower edge thereof. The raceway 62 terminates at identical power blocks 63 and 64 which are disposed adjacent the opposite lower corners of the panel. The power blocks 63 and 64 are electrically connected by suitable wires or cables which extend through the raceway 62. As illustrated in FIG. 2, the power blocks are joined by power wires 66 and 67, and ground wire 68. The power block of one panel, such as the block 63 of the panel 11, is joined to the power block 64A of the adjacent panel 11A by means of a flexible power connector 71.

Power is supplied to the wall structure 10 from a suitable junction box 72, which junction box may be located either in the floor or in the ceiling as illustrated in FIG. 1. A suitable power cable 73 extends from the junction box 72, which power cable 73 is surrounded by a protective conduit 74 which may be either rigid or flexible. The power cable 73 extends downwardly through the hollow interior of the adjacent side rail 16 and is electrically connected to the power block 63 which is disposed under the side rail 16. The manner in which the power cable 73 is electrically connected to the power block 63 will be explained hereinafter.

Figure 4:
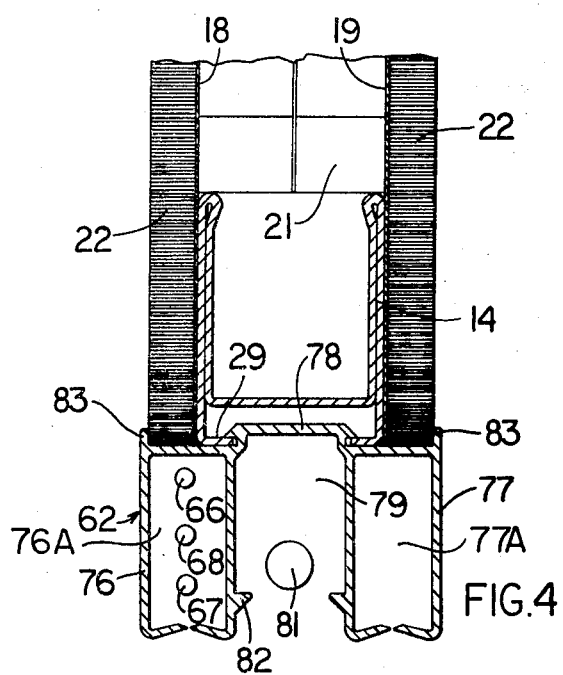

Considering now the raceway 62, and referring specifically to FIG. 4, the raceway 62 includes a pair of substantially tubular rails 76 and 77 joined at their upper ends by a center web portion 78 which extend between and projects upwardly from the tubular rails. The center web portion 78 has a pair of undercut grooves formed in the opposite sides thereof, which grooves accommodate the free edges of the flanges 29 formed on the bottom rail 14, whereby the raceway 62 can be slidably inserted and hence fixedly mounted on the bottom rail 14. The tubular rails 76 and 77 define channels 76A and 77A, respectively which accommodate therein the electrical wires, such as the wires 66, 67 and 68. The rails 76 and 77 are separated by an intermediate channel-shaped space 79 which accommodate therein one or more communication cables 81. Flanges 82 are provided on the inner walls of the tubular rails to accommodate suitable spring clips (not shown) for retaining the cable 81 within the space 79.

The outer walls of the raceway 62, as illustrated in FIG. 4, are substantially flush with the outer surfaces of the panel, namely the outer surfaces of the carpet layers 22, so that the overall panel has substantially flat and flush exterior sides. The raceway does, however, have small upwardly projecting flanges 83 which overlap the outer lower corners of the carpet layers 22.

Referring to FIGS. 7-12, the power block 63 (which is identical to the power block 64) includes a hollow boxlike housing 91 having opposite and substantially parallel end walls 92 and 93 joined by substantially parallel sidewalls 94 and 96. The housing is closed by top and bottom walls 97 and 98, respectively. The housing 91 is formed from an electrically insulative material, such as by being molded from a plastic material. To facilitate manufacture, the housing is preferably molded in two substantially identical halves. The housing 91 has an exterior cross-section which is compatible with the cross-section of the raceway 62 so that the sidewalls 94 and 96 are substantially flush with the sidewalls of the raceway 62 when assembled on the panel. In addition, the sidewalls of the housing have upwardly projecting flanges 99 which constitute extensions of the flanges 83 on the raceway 62.

A blocklike projection 101 extends upwardly from the top wall of the housing 91 and extends between the flanges 29 on the lower rail 14 when the power block is mounted thereon. The projection 101 has a pair of outwardly projecting lugs 102 formed thereon which are spaced upwardly from the top wall of the housing to enable the flanges 29 to extend thereunder, as illustrated in FIG. 8, whereby the housing can be mounted on the lower rail 14 by being slidably inserted from one end thereof. One end of the projection 101 extends outwardly past the end wall 92 and accommodates therein a screw 103 for permitting the housing 91 to be secured to the lower rail 14.

As shown in FIGS. 10 and 11, the projection 101 has openings 106, 107 and 108 formed therethrough, which openings respectively accommodate therein the power lead 109, ground lead 111 and power lead 112 as associated with the power cable 73 (FIG. 2) to supply electrical energy to the power block.

The rear wall 92 of the housing has, as shown in FIG. 8, openings 116, 117 and 118 formed therethrough, which openings are partially protected by a projecting flange 119. The openings 116–118 are aligned with the tubular rail 76. Similar openings 116′–118′ are formed on the other side of the rear wall 92, which openings 116–118′ are aligned with the other tubular rail 77. The openings 116–118 (or 116′–118′) are adapted to accommodate therein the wires (such as the wires 66, 67 and 68) which extend through one or both of the tubular rails for electrically connecting the power blocks 63 and 64 as disposed adjacent the opposite edges of the panel.

The sidewall 94 of the housing has slots 121–122 (FIG. 7) and opening 123 extending therethrough, thereby forming a conventional socket-type receptacle adapted to receive either a conventional two or three-prong plug. A similar socket-type receptacle is formed in the opposite sidewall 96, with the individual slots and opening in sidewall 96 being directly aligned with the slots and opening in sidewall 94.

Figure 12:
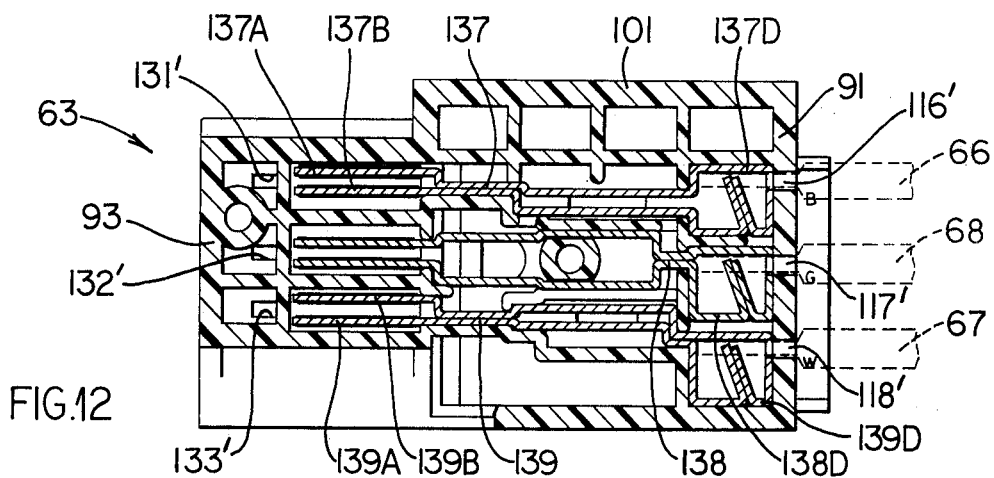

An opposed pair of recesses 126 and 127 (see FIGS. 7, 9 and 10) are formed in the housing 91, which recesses project inwardly into the sidewalls 94 and 96 and extend longitudinally so as to terminate in the end wall 93. The recesses 126 and 127 project upwardly from the bottom of the housing 91 but terminate short of the top wall 97. The recess 126 (and the identical recess 127) has a back wall 128 which is substantially parallel to but laterally offset from the associated sidewall 94. This backwall 128 has three substantially parallel slots 131, 132 and 133 formed therein, which slots form a receptacle for a special three-prong plug as associated with the flexible connector 71, as explained hereinafter. A pair of projections 134 and 136 also extend outwardly from the wall 128 in the vicinity of the slots 131 and 133 as illustrated in FIG. 7. The opposite recess 127 also has three slots 131′–133′ formed in the back wall thereof, as shown in FIG. 12, which slots 131′–133′ are respectively individually aligned with the slots 131—133.

The housing 91 contains (FIGS. 11 and 12) three electrically conductive members 137, 138 and 139, which members are substantially of a U-shaped configuration when viewed from above, and are disposed vertically one above the other. Each of these conductive members is formed from a pair of copper plates which effectively overlie one another and are fixedly connected together, with the individual copper plates being suitably deformed to have the desired configuration.

Specifically, the conductive member 137 includes a pair of parallel conductive portions 137A and 137B (FIGS. 12 and 16) aligned with the slots 131 and 131′. Conductive member 138 also includes electrically conductive portions 138A and 138B aligned with the slots 132 and 132′, and the conductive member 139 includes parallel conductive portions 139A and 139B aligned with the slots 139A and 139B. These parallel conductive portions, such as 137A and 137B, and their association with the respective slots, such as 131, results in the formation of a three-pronged electrical receptacle or socket accessible from either recess 126 or 127.

The conductive members 137, 138 and 139 also respectively have conductive portions 137C, 138C and 139C (FIGS. 10 and 11) associated therewith, which portions are disposed directly beneath the openings 106, 107 and 108, respectively. The electrical leads 109, 111 and 112 can accordingly be directly connected to the conductive members 137, 138 and 139 respectively. The member 138 also has an additional portion 138E (FIG. 11) which projects upwardly and connects to the screw 103 (FIG. 8). Since the conductive member 138 is connected to the ground lead 111, the frame of the channel is also grounded by virtue of the connection provided by the portion 138E and the screw 103.

As noted above, the individual conductive members 137–139 are of a substantially U-shaped configuration. The free ends of the legs of the U-shaped configuration are, as illustrated in FIGS. 10 and 12, disposed closely adjacent the openings 116–118 and 116′–118′. Thus, the leg of the U-shaped conductive member 137 have conductive portions 137D formed thereon which are disposed closely adjacent the openings 116 and 116′. Similar conductor portions 138D and 139D are formed on the members 138 and 139, respectively, with portions 138D being disposed adjacent the openings 117 and 117′, and portions 139D being disposed adjacent the openings 118 and 118′. Thus, the electrical wires 66, 67 and 68, when inserted through the openings 116–118 or 116′–118′, will engage the electrically conductive portions 137D, 138D and 139D, respectively.

Considering now the flexible electrical connector 71, as illustrated in FIGS. 13–16, same includes a pair of hollow housing elements 146 and 147 formed from an electrically insulative material, as by being molded from a plastic material. Housing element 146 includes a support portion 146A which is continuous with and projects outwardly from the lower wall thereof and has a bearing pin or projection 146B integrally associated therewith. The housing element 146 also has a partial cylindrical hinge portion 146C which projects outwardly and is spaced upwardly from the support portion 146A.

The other housing element 147 is similarly formed in that it includes a support portion 147A having a hinge element 147B thereon, which support portion 147A projects outwardly from the upper wall of the housing element 147. In addition, a partial cylindrical hinge part 147C is spaced downwardly from the support portion 147A, whereby the two housing elements 146 and 147 can have the parts 146A, 147A, 146C and 147C hingedly connected as shown in FIGS. 13–15.

The housing element 146 has an internal wall 148 which closes off approximately the lower half of the housing, and a similar wall 149 is formed in the housing element 147 to close off approximately the upper half of the housing. In addition, the adjacent axial ends of the hinge portion 146C and 147C are in open communication, as shown in FIG. 13.

The housing element 146 has three electrical conductors 151, 152 and 153 embedded therein, which conductors are respectively connected to the ends of electrical cables 156, 157 and 158. These cables 156–158 pass upwardly over the wall 148, through the aligned hinge parts 146C and 147C, and beneath the wall 149 into the housing element 147 where they are respectively connected to a further set of embedded electrical conductors 151A, 152A and 153A.

Three electrical plugs or prongs 161, 162 and 163 are associated with the housing element 146 and project outwardly therefrom, which prongs are adapted to be received within the socket formed by the openings 131, 132 and 133. The prong 162 is directly connected to the electrical conductor 152 inasmuch as this constitutes the ground connection. However, the prong 161 is normally maintained out of electrical contact with the associated conductor 151, and for this purpose the prong 161 includes a first leg 164 which is embedded in the housing element 146 while being electrically insulated from the conductor 151. The leg 164 is in turn connected to a further resiliently deflectable leg 166 which extends outwardly through an opening 168 formed in the housing element, which leg 166 has a contact portion 167 thereon which is adapted to be resiliently deflected upwardly into engagement with the conductor 151 when the prong 161 is inserted through the slot 131. The projection 134 which is disposed directly below the slot 131 assists in deflecting the leg 166 upwardly so that it engages the conductor 151.

The prong 163 is identical to the prong 161 and is thus adapted to be resiliently deflected into engagement with the conductor 153, as by being cammed upwardly by the projection 136 when the prong 163 is inserted into the slot 133.

The housing element 147 has prongs 161A, 162A and 163A projecting therefrom which are substantially identical to the prongs 161, 162 and 163, respectively. Further description thereof is not believed necessary.

The two housing elements 146 and 147, as associated with the flexible connector 171, can be relatively swingably displaced about the hinge axis defined by the parts 146C and 147C, whereby the parts can be selectively angularly displaced substantially as indicated by dotted lines in FIG. 10. The connector 71 will thus readily accommodate whatever angular orientation is desired between two adjacent hingedly connected panels. When adjacent panels are hingedly connected by the hinge 51, and are also connected by the flexible electrical connector 71, the hinge axis of the connector 71 is substantially aligned with the hinge axis 52 of the flexible hinge element 51.

OPERATION

The assembly or operation of a wall structure incorporating the panels of the present invention is believed self-evident from the above-description. However, various aspects of the assembly and operation will be briefly described to ensure a complete understanding thereof.

When two or more panels are connected so as to form a wall structure, the panels are connected by slidably inserting the flexible hinge member 51 into the grooves 39 of two adjacent panels substantially as illustrated in FIG. 5. With the adjacent panels so hingedly connected, then the top caps 31 are mounted on the individual panels. The panels can also be suitably electrically connected merely by joining the adjacent power blocks, such as the blocks 63 and 64A in FIG. 2, by use or the flexible connector 71. The prongs 161-163 are suitably inserted through the slots 131-133 in the power block 63, and in a similar manner the prongs 161A-163A are inserted through the appropriate slots formed in the power block 64A. With the flexible connector 71 joined to the power blocks 63 and 64A, the primary portions of the housing elements 146 and 147 are accommodated within the recesses (such as 126) formed in the power blocks so that the flexible connector 71 is substantially flush with the sidewalls of the panels to provide a smooth and uniform exterior appearance. Further, since the hinge axis of the connector 71 is substantially aligned with the hinge axis 52 of the panel connector 51, the panels can be relatively angularly displaced even after the electrical connector 71 has been joined to the adjacent power blocks.

If one end of the electrical connector 71 should become disconnected from one power block, even though the other end of the connector is still joined to a "hot" power block, this does not create any hazardous condition inasmuch as the prongs 161 and 163 (or 161A and 163A) are immediately deenergized as soon as the prongs are withdrawn from the power block. Thus, even though one end of the connector 71 is connected to an electrically energized power block, nevertheless the exposed prongs at the other end of the connector will be electrically "cold".

Figure 17:
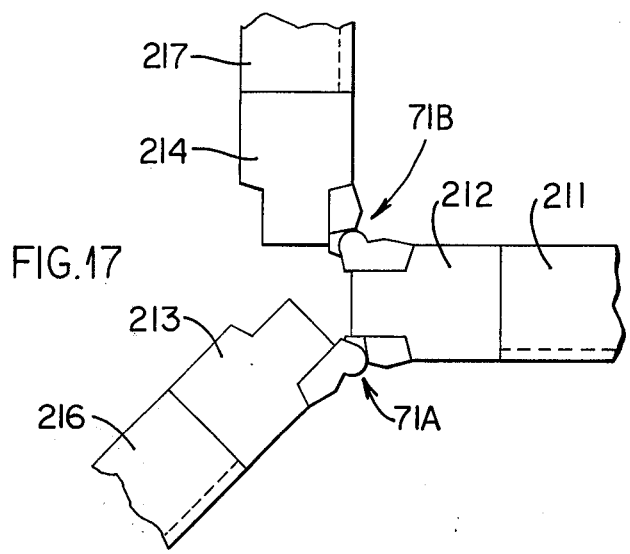
FIG. 17 is a fragmentary sectional view illustrating three panels electrically connected together.

Since the slots 131-133 and 131'-133' as disposed on opposite sides of each power block are associated with the same set of electrical conductive elements 137-139, the flexible connector 71 can be located on either side of the adjacent panels for electrically coupling same. Further, if it is desired to electrically couple more than two panels at a single joint, such as three panels as illustrated in FIG. 17, then this can be accomplished by utilizing two flexible connectors, such as the connectors 71A and 71B illustrated in FIG. 17. Since the power block 212 as associated with the panel 211 results in energization of both connectors 71A and 71B, which connectors in turn electrically energize the power blocks 213 and 214 as associated with the panels 216 and 217 respectively, the panels 216 and 217 are likewise electrically energized but are electrically connected in parallel relationship.

Thus, a wall structure employing a large number of prewired panels constructed according to the present invention can be easily and efficiently assembled in a desired location. The assembly of wall panels can be easily wired together merely by joining same together by means of the flexible electrical connectors 71. This operation can be performed easily and efficiently by relatively nonskilled personnel. Thereafter, the assembled wall structure can be suitably provided with electrical energy by running a power line, such as the line 73, from a main power box (such as 72) to one of the power blocks 63 or 64 as associated with one of the panels. In this manner, all of the sockets associated with the power blocks of the individual panels are accordingly energized and in condition so as to receive therein conventional electrical plugs.

In addition, suitable communication cables, such as telephones, Telex or intercom cables, can also be run along the panels in a concealed manner. For this purpose, the communication cables, such as the cable 81 illustrated in FIG. 4, can extend along the space 79 as formed between the tubular rails 76 and 77 of the raceway 62. The housing 91 of the power block is also provided with a recess 89 (FIG. 8) formed in the bottom wall thereof and extending longitudinally of the housing, which recess 89 is substantially aligned with the space 79 so as to permit the communication cables to pass therethrough. The communication cables can thus be easily mounted on and run along the wall structure while being effectively hidden from sight.

Figure 18:
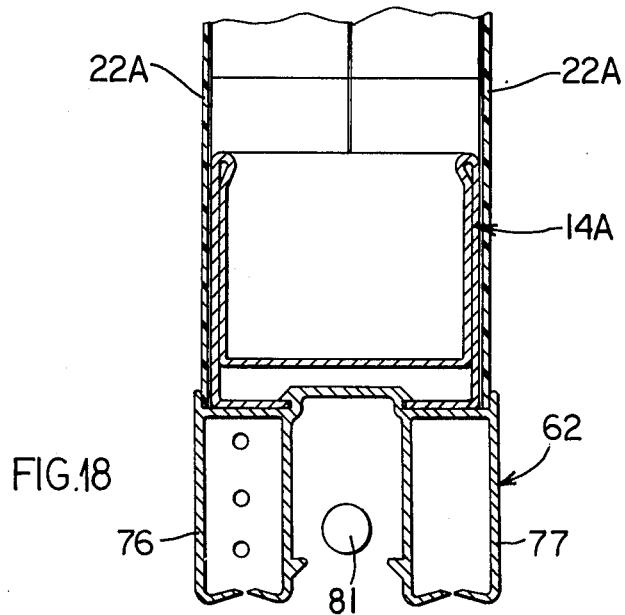
FIG. 18 is a sectional view similar to FIG. 4 but illustrating a modification of the panel.

Referring now to FIG. 18, same illustrates therein a fragmentary cross-section of a modified wall panel which is substantially identical to the wall panel illustrated in FIG. 4 except that the wall panel is covered with outer layers 22A which may be either plastic or fabric sheets. When plastic or fabric sheets 22A are used in place of carpets 22, then the rails forming the rectangular frame of the panel are accordingly provided with an increased thickness so as to compensate for the reduced thickness of the sheets 22A. The panel structure is, however, in all other respects identical to the panel structure described above.

MODIFICATION

FIGS. 19-22 illustrate a modified panel which possesses many of the structural and operational features of the panel illustrated in FIGS. 1-16, whereupon the same reference numerals will be used to designate the corresponding parts except for the addition of the prefix "1-" thereto.

Figure 19:
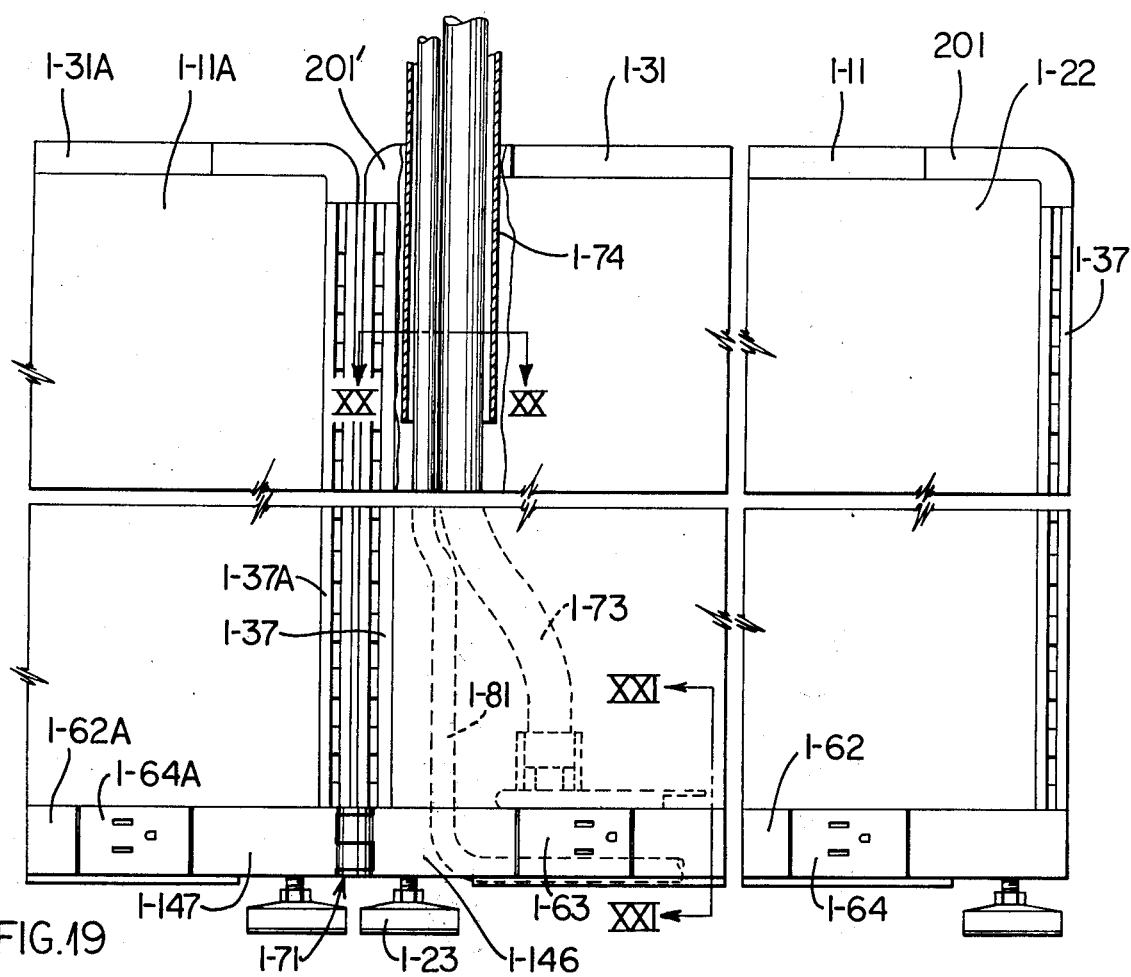
FIG. 19 is a fragmentary view similar to FIG. 2 but illustrating a further modification of the panel.

FIG. 19 illustrates a wall system 1-10 formed from a pair of substantially identical panels 1-11 and 1-11A. The structure of the panel 1-11 is substantially identical to the structure of the panel 11 described above, except for the structural features described below.

In this variation, the top cap 1-31 and the end or side cap 1-37 are joined by a removable L-shaped corner cap 201, which cap is preferably provided with a rounded corner thereon. One of the corner caps, namely the cap 201', has an opening extending through the horizontal leg thereof for permitting the power and communication cables to be fed downwardly from the ceiling for supply to the wall system. In this embodiment, the power conduit 1-73 and the communication cable 1-81 are fed through an elongated rigid tubular member or post 1-74 which has the upper end thereof fixed to the ceiling at a terminal box therein. The lower portion of post 1-74 projects through the opening in the corner cap 201' so as to be slidably telescopically received within the interior of the side rail 1-16. The communication cable 1-81 and power conduit 1-73 thus extends downwardly through the interior of the channel-shaped side rail 1-16, whereupon the power conduit 1-73 is electrically connected to the adjacent power block 1-63.

Figures 20, 21:
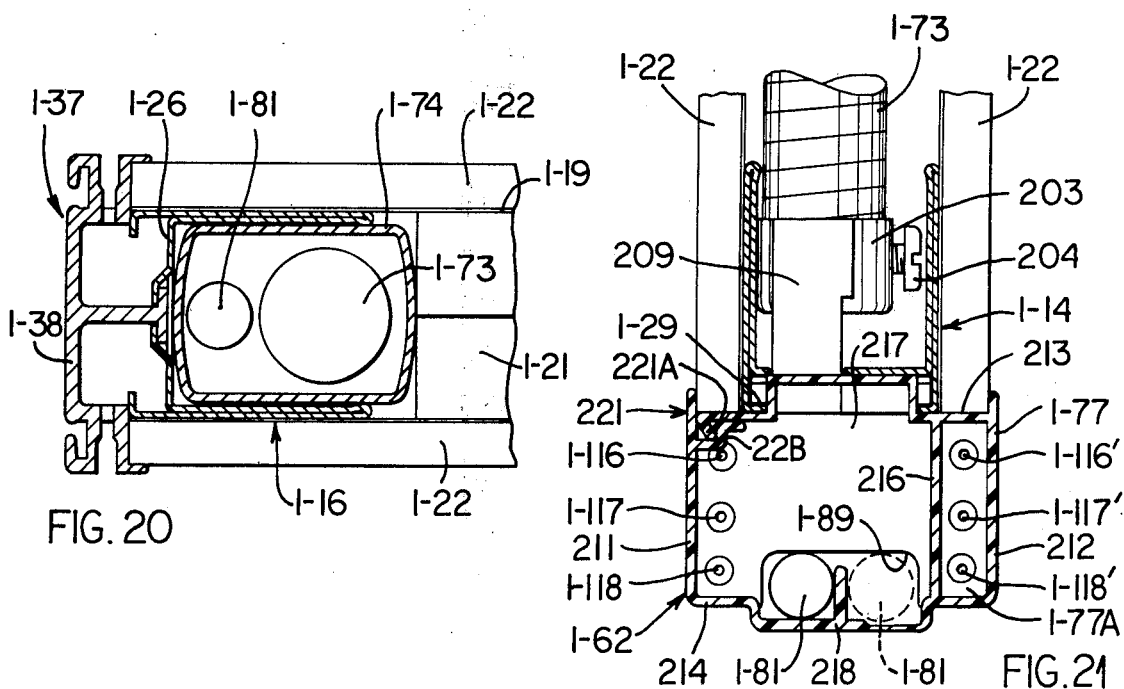
FIGS. 20 and 21 are enlarged, fragmentary sectional views taken respectively along lines XX—XX and XXI—XXI in FIG. 19.

The power blocks 1-63 and 1-64 are spaced slightly inwardly from the adjacent vertical edges of the panel to permit the communication cable 1-81 to be fed directly downwardly through the siderail 1-16 and then bent under the power block 1-63 so as to be fed into the raceway 1-62 which extends longitudinally along the lower edge of the panel between the identical power blocks 1-63 and 1-64, substantially as illustrated in FIG. 19 and 21. Other than the slight inward displacement of the power block, they are otherwise substantially similar to the power blocks 63 and 64 described above, particularly with respect to the internal electrical structure thereof and the manner in which they are provided with sockets for the flexible connector 1-71 and for conventional 3-pronged electrical plugs.

The flexible power connector 1-71 is substantially identical to the power connector 71 except that the housing elements 1-146 and 1-147 are necessarily of increased length so as to compensate for the slightly greater spacing between the adjacent cooperative pair of power blocks 1-63 and 1-64A.

To connect the power conduit 1-73 to the power block 1-63 (or the identical power block 1-64), the power conduit 1-73 is provided with a ferrule 203 which is secured to the lower end of the conduit by a screw 204. The ferrule 203 is sleeved over a substantially cylindrical projection 206 (FIG. 22) which extends upwardly from the top wall of the power block, whereupon tightening of the screw 204 causes same to engage the projection 206 to lockingly connect the power conduit to the power block. The projection 206 has an opening 207 projecting centrally thereof, which opening is flanked by a pair of slots 208. The opening 207 and the slots 208 terminate in openings 1-106, 1-107 and 1-108 through which project the three conductors associated with the power conduit 1-73. The power block also has a pair of platelike flanges 209 projecting upwardly therefrom, which flanges straddle the projection 206 so as to have the ferrule 203 disposed therebetween.

The power block 1-63 is slidably accommodated within the bottom rail 1-14 as described above relative to the power block 63.

Considering now the raceway 1-62, same comprises an elongated tubular member having opposed substantially parallel sidewalls 211 and 212 joined together by a top wall 213 and a bottom wall 214. The top wall 213 has a central portion which projects upwardly and is provided with sidewardly projecting ears or lugs for extending between and overlapping the lower flanges 1-29 on the bottom rail 1-14 for supporting the raceway 1-62 on the rail 1-14.

The raceway 1-62 includes a tubular rail 1-77 extending longitudinally along one side thereof, which rail is defined between the sidewall 212 and a further interior partition 216, whereby there is defined therebetween a space 1-77A which aligns with the cable openings formed in the ends of the power blocks, such as the openings 1-116', 1-117' and 1-118'. This space 1-77A accommodates therein the power cables which extend between and electrically interconnect the power blocks 1-63 and 1-64. While the cables are not shown in FIGS. 21, these cables are equivalent to the cables 66, 67 and 68 as shown in FIGS. 2 and 4.

The remainder of the raceway 1-62 defines a further closed space 217 which extends between the vertical walls 211 and 216. This space 217 is provided so as to accommodate one or more communication cables, such as the cable 1-81. The space 217 has the lower portion thereof aligned with the recess 1-89 which extends centrally under the power blocks, and for this purpose the lower wall 214 of the raceway has a channel-shaped portion 218 depressed downwardly therefrom which, in association with the recess 1-89, forms a suitable space which is able to accommodate one or more communication cables 1-81 therein so that the communication cables can run straight through the raceway and directly under the power blocks when extending between adjacent panels.

In this embodiment, the raceway includes a releasable catch or latch 221 coacting between the sidewall 211 and the adjacent edge of the top wall 213 so as to permit access to the space 217. This latch 221 includes a downwardly projecting hook or flange 221A formed on the edge of the top wall 213, and a L or Z-shaped flange 221B secured to and projecting inwardly from the sidewall 211. The raceway 1-62 is preferably extruded from a plastic material and thus possesses sufficient resiliency and flexibility to enable the wall 211 to be flexed downwardly and outwardly so as to release the latch 221 and thereby provide access to the communication space 217. This permissible flexing movement of the wall 211 is in part permitted by the flexibility of the bottom wall 214.

The remaining structure and assembly of the wall systems 1-10 is substantially indentical to the system 10 described above. However, the wall system 1-10 does have the additional advantage that the communication cables are totally enclosed and hence hidden from view, while at the same time these cables can be readily installed and interchanged after the wall system has been assembled inasmuch as the lower raceway 1-62 does have an openable wall which provides access to the space 217.

While FIG. 19 illustrates the power conduit as extending from a terminal box located adjacent the ceiling, nevertheless the wall system of the present invention is also readily adaptable for use in situations where the power is supplied from a terminal box located either in the floor or in a sidewall. In this instance, the power can be supplied to one of the power blocks by utilizing a connector 226 as illustrated in FIG. 22, which connector is joined to one end of a flexible conduit 227 which has the electrical power cables disposed therein. Conduit 227 has its other end connected to a suitable floor or wall-mounted terminal box. The connector 226 includes an elbow 228 having a metal cover plate 229 threaded thereon, which cover plate is screwed to a housing 231, preferably molded of plastic. The housing 231 has a mounting portion 232 which has a configuration substantially identical to the configuration of the housing element 1-146 or 1-147 associated with the flexible connector 1-71, so that the housing portion 232 can thus be plugged into the socket associated with the power block so as to energize the power block. The housing portion 232 has three prongs (not shown) projecting therefrom which are identical to the prongs provided on the flexible connector 1-71.

While the wall panel of this invention does encompass a panel which will extend from floor to ceiling, nevertheless the panel is normally of the type which terminates substantially below the ceiling.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a portable, prefabricated wall panel positionable in a vertical upright position and having a frame and panel means secured to the opposite sides of said frame and defining the exterior vertical side surfaces of said panel, the improvement comprising elongated channel means fixedly secured to said panel, said channel means extending across said panel between a pair of opposed edges thereof and defining a closed interior passage extending longitudinally therealong, first and second electrical terminals fixedly mounted on said panel adjacent the opposite ends of said channel means and disposed adjacent the opposed edges of said panel, at least said first electrical terminal including a pair of first multiple-hole electrical sockets formed therein, one of the pair of first sockets being on one side of the panel and the other being on the other side of the panel, said first sockets each being adapted to receive a conventional two or three-pronged electrical plug therein, said first and second terminals each including a pair of second electrical sockets formed therein, one of the pair of second sockets being on one side of the panel and the other being on the other side of the panel, said second sockets each defining a plug receptacle having a different geometrical configuration from the plug receptacle defined by each of said first sockets so that the plugs which mate with said second sockets will not mate with said first sockets, and electrical cable means extending along said passage and interconnected to said first and second terminals for transmitting electrical energy therebetween.

2. A wall panel according to claim 1, wherein said channel means extends transversely across the width of the panel and has the opposite sidewalls thereof substantially flush with the exterior side surfaces of the panel as defined by said panel means, and each said electrical terminal comprising a blocklike member aligned with the channel-means and having a width substantially equal to the width of said channel means.

3. A wall panel according to claim 2, wherein each said electrical terminal includes a pair of exterior sidewalls substantially aligned with the outer sidewalls of said channel means, each of said sidewalls associated with said first terminal having one of said first electrical sockets formed therein, each said electrical terminal also having opposed recesses formed in the sidewalls thereof adjacent one end thereof, said recesses each being defined by a wall means which is spaced inwardly from the adjacent terminal sidewall, and said wall means of each recess having one of said second electrical sockets formed therein.

4. A wall panel according to claim 2, wherein said channel means has a tubular rail extending longitudinally therealong and defining said interior passage, said channel means also having wall means defining an elongated space extending longitudinally of said channel means and located between the sidewalls of the channel means, said elongated space being adapted to receive therein communication cables or the like.

5. A wall panel according to claim 4, including leg means fixed to said panel and projecting downward for supporting said panel on a floor.

6. A wall panel according to claim 4, wherein said elongated space is totally enclosed by said wall means, and said wall means including two relatively movable wall portions releasably connected together for permitting access to said space.

7. A wall panel according to claim 6, wherein said wall portions comprise the top wall and one of the sidewalls of said channel means, and said one sidewall being releasable from to provide access to said elongated space from one side of said channel means.

8. In a wall structure formed from a plurality of portable partitions of substantially rectangular configuration, and securing means for joining said partitions together with vertical edges thereof adjacent one another, the improvement comprising:
 raceway means fixed to a horizontally extending edge of each partition and extending longitudinally therealong, said raceway means defining therein a longitudinally extending interior passageway;
 a pair of electrical power block means fixedly mounted on each of said partitions, said pair of power block means being disposed adjacent and aligned with the opposite ends of said raceway means and being disposed directly adjacent the opposite vertical edges of said partition;
 each said power block means having electrical socket means associated therewith;
 electrical cable means disposed within and extending through said interior passageway and connected to the power block means as disposed adjacent the opposite ends of said raceway means for transmitting electrical energy therebetween, said cable means being connected to the electrical socket means associated with each said power block means; and flexible electrical connector means for electrically connecting one of said power block means as disposed adjacent a first vertical edge of a first partition to a further said power block means as disposed adjacent a second vertical edge of a second partition when said first and second partitions are disposed closely adjacent one another and are connected together by said securing means, said electrical connector means including first electrical plug means adapted for reception within the socket means associated with said one power block means and second electrical plug means adapted for reception within the socket means associated with said further power block means.

9. A wall structure according to claim 8, wherein each said power block means including second electrical socket means for accomodating a conventional two or three-pronged plug, said second electrical socket means including a pair of identical sockets disposed on opposite sides of said power block means, one of the pair of sockets being on one side of the partition and the other being on the other side of the partition, each said socket defining a plug receptacle which is of a different geometrical configuration than the plug receptacle defined by said first-mentioned socket means.

10. A wall structure according to claim 8, wherein said partition includes a substantially rectangular frame defined by substantially parallel top and bottom rails fixedly interconnected by substantially parallel side rails, each of said rails defining an interior passage extending therethrough, sheetlike panel means overlying the opposite sides of said frame for defining the exterior surfaces of said partition, and channel-shaped end caps fixedly but removably connected to the opposite side rails of the partition, said end caps overlying and extending longitudinally of the side rails, each said end cap having a pair of elongated grooves formed therein adjacent the opposite edges thereof, said grooves extending vertically throughout substantially the length of the end cap, and said securing means comprising a vertically elongated hinge member having two hinge plates joined by a hinge, said hinge plates having projections thereon which are slidably accommodated within a pair of said grooves as formed in the opposed end caps of an adjacent pair of partitions for joining said partitions together.

11. A wall structure according to claim 8, wherein said raceway means extends along the lower edge of the partition, and leg means fixed to said partitions and projecting downwardly below said raceway means, said leg means normally maintaining said raceway means spaced at least slightly upwardly above the floor.

12. A wall structure according to claim 8, wherein said securing means permits said first and second wall partitions to be relatively angularly displaced about a substantially vertically extending hinge axis, and wherein said flexible electrical connector means includes hinge means for permitting relative angular displacement to said partitions after said connector meanshas been joined to said partitions, said hinge means being disposed between said first and second plug means.

13. A wall structure according to claim 12, wherein said raceway means extends along the lower edge of the partition and has a channel-shaped space formed therein, each said power block means also having a downwardly opening channel-like space formed therein and substantially aligned with the space in said raceway means, whereby said spaces can accommodate communication cables or the like.

14. A wall structure according to claim 12, wherein said raceway means includes first and second tubular portions disposed adjacent the opposite sides of said partition and extending longitudinally therealong, one said tubular portion defining therein said interior passageway for accommodating said electrical cable means, said other tubular portion defining therein a passageway for accommodating communication cables.

15. A wall structure according to claim 8, wherein each said power block means includes a boxlike housing extending across the width of said partition and having opposed sidewalls disposed substantially flush with the exterior sides of said partition, said housing having a pair of recesses formed in the opposite sidewalls thereof, each of said recesses being defined by a rear wall which is offset inwardly from the adjacent sidewall of the housing, said socket means including a socket associated with each of said recesses, and the plug means of said flexible electrical connector means including a housing portion adapted to be accommodated within one of said recesses and a plurality of electrical prongs projecting outwardly of the housing portion oand adapted to be accommodated within the socket associated with said one recess.

16. A wall structure according to claim 15, wherein each said power block means includes second electrical socket means associated therewith, said second socket means including a socket associated with each of the sidewalls of said housing, the sockets of said second socket means defining a plug receptacle which is of a different geometrical configuration than the plug receptacle defined by the sockets of said first-mentioned socket means.

17. A wall structure according to claim 16, wherein each said power block means includes three separate electrically conductive elements disposed within said housing, each of said conductive elements comprising a part of the first and second socket means.

18. A wall structure according to claim 12, wherein said flexible electrical connector means including first and second housing elements having cooperating hinge parts formed thereon and defining said hinge means, said hinge parts defining a substantially vertically hinge axis which is approximately aligned with the hinge axis defined by the securing means, and said first and second plug means being associated with said first and second housing elements respectively.

19. A wall structure according to claim 18, wherein each of said plug means includes a plurality of electrical prongs projecting outwardly from the respective housing element, and a plurality of elongated electrical connectors disposed within and extending between said housing elements, said electrical conductors extending through the hinge parts and having the opposite ends thereof adapted for electrical interconnection to said prongs.

20. A wall structure according to claim 19, wherein each of said plug means includes means for electrically connecting some of said prongs to the associated electrical connectors only when the plug means is inserted into said socket means.

21. A wall structure according to claim 12, wherein said raceway means defines therein a longitudinally extending interior space which is substantially parallel to but isolated from said interior passageway, said interior space being adapted to accommodate communication cables or the like therein.

22. A wall structure according to claim 21, wherein said raceway means includes a pair of opposed and substantially parallel sidewalls extending longitudinally thereof and positioned so as to be substantially flush with the sidewalls of the partition, said raceway including an interior wall disposed between said sidewalls and extending between the top and bottom walls of the raceway means so as to define said elongated interior passageway between said interior wall and one of said sidewalls, said elongated interior space being defined between said interior wall and the other sidewall, and one of the walls of said raceway means as associated with said elongated space being flexible so as to be movable between a first position wherein said elongated space is closed and a second position permitting access to said elongated space.

23. A flexible plug-type electrical connector for electrically joining two electrical sockets, comprising:
   housing means including first and second housing parts constructed of an electrically insulative material, and connecting means joining said first and second housing parts for permitting relative swinging movement therebetween;
   first and second electrical plug means respectively associated with said first and second housing parts, each of said first and second plug means including a plurality of electrically conductive prongs projecting outwardly from the respective housing part;
   a plurality of flexible cablelike electrical connectors disposed within said housing means and extending from said first housing part through said connecting means into said second housing part, the opposite ends of said electrical connectors being electrically connected to said first and second plug means;
   said first plug means including first means for normally maintaining at least one of said prongs electrically disconnected from the respective electrical connector when said first plug means is disengaged from an electrical socket; and
   said second plug means including second means for normally maintaining at least one of said prongs electrically disconnected from the respective electrical connector when said second plug means is disengaged from an electrical socket.

24. A connector according to claim 23, wherein said connecting means includes first and second hollow hinge parts fixedly connected to said first and second housing parts respectively, said hinge parts joining said housing parts together for permitting said housing parts to be relatively swingably displaced about a hinge axis defined by said hinge parts, and the prongs associated with said first and second plug means projecting outwardly from the housing parts in a direction substantially perpendicular to the hinge axis.

25. A connector according to claim 23, wherein said first means is associated with a first prong of said first plug means and includes a first stationary electrical contact fixed to one end of the respective electrical connector and a second movable contact spaced from said first contact, and said first prong including a first leg portion fixed to said first housing part and projecting outwardly therefrom and a second leg portion fixed to said first leg portion and being resiliently movable when said prong is inserted into a socket, said second leg portion having said second contact mounted on the inner end thereof so that said second contact is moved into engagement with said first contact when said first prong is inserted into a socket, and wherein said second means is constructed substantially identically to said first means.

26. In a portable prefabricated wall panel having means defining an elongated passageway disposed interiorly of the panel adjacent a horizontal edge thereof, and electrical cable means disposed within said passageway and extending longitudinally therethrough, the improvement comprising:
   a pair of electrical power block means fixedly mounted on said panel adjacent the opposite vertical edges thereof, said power block means being mounted on said panel adjacent the opposite ends of said passageway, and said electrical cable means being connected to said power block means;
   said power block means comprising a boxlike housing constructed of an electrically insulative material and a plurality of electrically conductive elements mounted within said housing and insulated from one another;
   said housing having first opening means formed in an end wall thereof for permitting said electrical cable means to project through said housing for engagement with said electrically conductive elements;
   second opening means formed in a sidewall of said housing and cooperating with the electrically conductive elements for defining first electrical socket means, said first socket means defining a first plug receptacle;
   third opening means formed in said housing and cooperating with the electrically conductive elements for defining second electrical socket means, said second socket means defining a second plug receptacle having a geometrical configuration which is different from the geometrical configuration of said first plug receptacle so that the plug which mates with said first plug receptacle will not mate with said second plug receptacle and vice versa; and
   said housing as associated with at least one of said power block means having fourth opening means formed therein for permitting an electrical supply conduit to project into said housing for connection to said electrically conductive elements.

27. A panel according to claim 26, wherein said housing includes a pair of substantially parallel sidewalls which are substantially flush with the exterior sides of the panel, said housing also including a pair of opposed and substantially parallel wall parts which are recessed inwardly from and laterally displaced relative to the adjacent sidewalls, said first socket means including a first socket associated with each of said sidewalls, and said second socket means including a second socket associated with each of said wall parts.

28. A flexible plug-type electrical connector for electrically joining two electrical sockets, comprising:
   housing means including first and second housing parts constructed of an electrically insulative material, and connecting means joining said first and second housing parts for permitting relative swinging movement therebetween;
   first and second electrical plug means respectively associated with said first and second housing parts, each of said first and second plug means including at least one electrically conductive prong projecting outwardly from the respective housing part;

a plurality of electrical connectors disposed within said housing means and extending from said first housing part through said connecting means into said second housing part, the opposite ends of said electrical connectors being electrically associated with said first and second plug means;

said first plug means having said one prong normally maintained electrically disconnected from its respective electrical connector when said first plug means is disengaged from an electrical socket; and said second plug means having said one prong normally maintained electrically disconnected from its respective electrical connector when said second plug means is disengaged from an electrical socket.

29. A connector according to claim 28, wherein said connecting means includes first and second hinge parts fixedly connected to said first and second housing parts respectively, said hinge parts joining said housing parts together for permitting said housing parts to be relatively swingably displaced about a hinge axis defined by said hinge parts, and the prongs associated with said first and second plug means projecting outwardly from the housing parts in a direction substantially perpendicular to the hinge axis.

30. A connector according to claim 28, wherein said plurality of electrical connectors includes first and second electrical connectors each of which terminates at opposite ends thereof in a pair of fixed contacts which are respectively associated with the first and second housing parts, and each of said first and second plug means including first and second electrically conductive prongs projecting outwardly from the respective housing part, the first and second prongs being associated with the contacts of the first and second connectors and being normally spaced a preselected distance from and electrically separated from the respective contacts so that the first and second prongs and the respective contacts are electrically joined together only when the respective plug means is joined with a mating part to form a quick connect-disconnect electrical coupling.

31. In an upright wall structure formed from a plurality of portable upright partitions which are joined together so that the vertical edges thereof are adjacent one another, the improvement comprising:

raceway means fixed to a horizontally extending edge of each upright partition and extending longitudinally therealong, said raceway means defining therein a longitudinally extending interior passageway;

a pair of electrical power block means fixedly mounted on each of said partitions, said pair of power block means being disposed adjacent the opposite ends of said raceway means in the vicinity of the opposite vertical edges of said partition;

electrical cable means disposed within and extending through said interior passageway and connected to the power block means as disposed adjacent the opposite ends of said raceway means for transmitting electrical energy therebetween;

an electrical connecting device for electrically connecting one of said power block means as disposed adjacent a first vertical edge of a first partition to a further said power block means as disposed adjacent a second vertical edge of a second partition when said first and second partitions are disposed with said first and second vertical edges closely adjacent one another, said electrical connecting device including means which permits it to angularly adjust to the desired horizontal angular orientation between the joined partitions;

a first quick connect-disconnect electrical connector coacting between said electrical connecting device and said one power block means for electrically connecting same together, and a second quick connect-disconnect electrical connector coacting between said electrical connecting device and said further power block means for electrically connecting same together, each of said first and second quick connect-disconnect electrical connectors being formed by two separable parts, one of said parts being associated with the respective power block means and the other part being associated with said electrical connecting device.

32. A wall structure according to claim 31 wherein said electrical connector comprises a plug-and-socket structure formed by said two separable parts.

33. A wall structure according to claim 31, wherein each said power block means includes a housing which extends substantially across the width of the respective partition and has opposed sidewalls which are substantially flush with the sidewalls of the partition, said housing having a pair of opposed recesses formed therein, said recesses extending inwardly from the adjacent sidewall of the housing, and said electrical connecting device including two housing parts which are adapted to be positioned within the recesses formed in the adjacent power block means as positioned in the vicinity of the adjacent vertical edges of the partitions, said electrical connecting device being positionable within the adjacent recesses as provided on either side of the adjacent joined partitions.

34. A wall structure according to claim 33, wherein said housing parts are joined by said means which permits the electrical connecting device to angularly adjust to the desired horizontal angular orientation between the joined partitions.

35. In a wall structure formed from a plurality of portable prefabricated partitions, at least three of said partitions being disposed as that a vertical edge of one partition is disposed closely adjacent a vertical edge on the remaining two partitions, and securing means for joining said three partitions together so that the mentioned vertical edges of said three partitions are closely adjacent, the improvement comprising:

raceway means fixed to a horizontally extending edge of each partition and extending longitudinally therealong, said raceway means defining therein a longitudinally extending interior passageway;

an electrical power block means fixedly mounted on each of said partitions, said power block means being disposed adjacent said raceway means;

a first electrical connector means for electrically connecting the power block means associated with a first one of said partitions to the power block means as associated with a second one of said partitions, and a second electrical connector means for electrically connecting said power block means as associated with the first one of said partitions to the power block means as associated with the third one of said partitions, each of said first and second electrical connector means being separable from said partitions;

each said electrical connector means including an electrically insulative housing having first and second parts and electrically conductive means disposed within said housing and extending between said first and second parts, each said electrical connector means also including means which permits it to angularly adjust to the desired horizontal angular orientation between the respective joined pair of partitions; and cooperating means associated with each said power block means and said electrical connector means for releasably electrically connecting same together, said cooperating means including first means associated with each of said first and second parts and second means associated with each of said power block means, first and second means forming a releasable plug-and-socket connection between said electrical connector means and each of the respective power block means.

36. In combination, a portable upright wall panel, raceway means fixedly secured to an edge of said panel and extending longitudinally thereof, said raceway means cooperating with said panel to define therein first and second interior passageways each of which extends longitudinally of said raceway means in parallel relationship, said raceway means including interior wall means which divides said raceway means into said first and second interior passageways and isolates them from one another, first and second electrical power block means fixed to said panel and positioned adjacent the opposite ends of said raceway means, each of said power block means having electrical means associated therewith and defining half of a quick connect-disconnect electrical connector, electrical cable means disposed within and extending longitudinally of said first interior passageway, said electrical cable means having the opposite ends thereof electrically connected to the first and second power block means, each of said first and second power block means having a channel-like clearance space extending longitudinally thereof in a direction substantially parallel with the elongated direction of said raceway means, said channel-like space being at least partially aligned with the adjacent end of said second interior passageway, opposed side walls associated with each of said power block means which project along and enclose the opposite sides of said channel-like clearance space, whereby communication cables can extend continuously through said second interior passageway and through the clearance spaces defined adjacent the first and second power block means while being effectively hidden from view.

37. The combination according to claim 36 wherein said raceway means is secured to the lower horizontally extending edge of said panel, and wherein the clearance spaces formed in said power block means extend horizontally through the power block means and open downwardly thereof.

38. In an upright wall structure formed from at least two portable upright partitions which are joined together so that the vertical edges thereof are adjacent one another, the improvement comprising:

means fixed to and extending longitudinally across each said partition and defining therein a longitudinally extending interior passageway;

electrical terminal means fixedly mounted on each of said partitions, said terminal means being disposed adjacent the interior passageway so as to communicate therewith;

separable means for electrically connecting a first said terminal means as mounted on a second partition when said first and second partitions are disposed with the opposed vertical edges thereof closely adjacent one another for transmitting electrical energy between said first and second terminal means, said separable means including plural separable portions, one of said portions being releasably connected with said first terminal means to form a quick connect-disconnect electrical connection therewith and a second of said portions being releasably connected with said second terminal means to form a quick connect-disconnect electrical connection therewith, said separable means being angularly flexible for permitting said first and second partitions to be relatively angularly adjusted to a desired horizontal angular orientation between the joined partitions while maintaining said first and second terminal means electrically connected together.

39. In an upright wall structure formed from at least two portable upright partitions which are joined together so that the vertical edges thereof are adjacent one another, the improvement comprising:

raceway means fixed to and extending longitudinally across each said partition so that the opposite ends of said raceway means are disposed adjacent the opposite vertical edges of the respective partition, said raceway means defining therein a longitudinally extending interior passageway;

a pair of terminal means fixedly mounted on each of said partitions, said pair of terminal means being disposed adjacent the opposite ends of said raceway means in the vicinity of the opposite vertical edges of said partition;

elongated cable means disposed within and extending through said interior passageway and connected to the terminal means as disposed adjacent the opposite ends of said raceway means for transmitting electrical energy therebetween;

separable means for connecting a first said terminal means as disposed adjacent a first vertical edge of a first partition to a second said terminal means as disposed adjacent a second vertical edge of a second partition when said first and second partitions are disposed with said first and second vertical edges closely adjacent one another for transmitting electrical energy between said first and second terminal means, said separable means including plural separable portions, one of said portions being associated with first terminal means and a second of said portions being associated with said second terminal means, said separable means being angularly flexible for permitting said first and second partitions to be relatively angularly adjusted to a desired horizontal angular orientation between the joined partitions while maintaining said first and second terminal means connected together.

40. A wall structure according to claim 39, wherein said one and second portions of said separable means are fixedly related with respect to said first and second terminal means, respectively, when connected thereto.

41. A wall structure according to claim 39, wherein each said partition includes means defining a socket which opens sidewardly through one of the sidewalls of the respective partition, said socket being connected to said cable means so that electrical energy can be supplied to or from said socket.

42. A wall structure according to claim 39, wherein said raceway means includes wall means dividing said interior passageway into first and second interior passages which extend parallel to one another and longitudinally of said raceway means, said cable means including a first cable disposed within said first passage and a second cable adapted to be disposed within and extend longitudinally of said second passage.

43. In an upright space divider system having a plurality of interconnected substantially rectangular upright partitions, said system including at least three said partitions with a first of said partitions having one vertical edge thereof positioned adjacent a vertical edge of a second said partition, and the other vertical edge of said first partition being positioned adjacent a vertical edge of a third said partition, the improvement comprising electrical power block means fixedly mounted on each said partition and forming an integral part of the partition, electrical socket means associated with said partition and electrically connected to said power block means, said socket means opening outwardly through one of the side walls of the partition and defining a plug-type receptacle for receiving therein a conventional two-prong or three-prong plug, a first separable means for electrically connecting the power block means of said first partition to the power block means on said second partition, and a second separable means for electrically connecting the power block means of said first partition to the power block means of said second partition, whereby said partitions are electrically connected together, each of said first and second separable means being identical and including plural separable portions with one of said portions being releasably connected to one power block means to form a quick connect-disconnect electrical connection therewith and a second of said portions being releasably connected with the other power block means to form a quick connect-disconnect electrical connection therewith, and each of said first and second separable means including structure for permitting the respective first and second portions to be relatively angularly adjusted to the desired horizontal angular orientation between the joined partitions.

44. A system according to claim 43, wherein a power conduit is interconnected between one of said power block means an external power source for supplying electrical energy to the interconnected series of power block means.

45. A system according to claim 44, wherein each of the quick connect-disconnect connections formed by the said portion of the separable means and the respective power block means is of the plug-and-socket type.

46. In a wall structure formed from a plurality of portable partitions of substantially rectangular configuration, and securing means for joining said partitions together with vertical edges thereof adjacent one another, the improvement comprising electrical power block means fixedly mounted on each of said partitions, each said power block means having electrical socket means associated therewith, and flexible electrical connector means for electrically connecting one said power block means as mounted on a first said partition to a further said power block means as mounted on a second said partition when the partitions are disposed with vertical edges thereof positioned closely adjacent one another, said flexible electrical connector means including first electrical plug means adapted for reception within the socket means associated with said one power block means and second electrical plug means adapted for reception within the socket means associated with said further power block means, said flexible electrical connector means permitting the first and second plug means to be relatively angularly adjusted to the desired horizontal orientation between the joined partitions.

* * * * *

UNITED STATES PATENT AND TRADEMARK OFFICE
CERTIFICATE OF CORRECTION

PATENT NO. : 4 060 294
DATED : November 29, 1977
INVENTOR(S) : Richard G. Haworth, Charles J. Saylor and Harold R. Wilson It is certified that error appears in the above-identified patent and that said Letters Patent are hereby corrected as shown below:

Column 14, line 35; change "downward" to ---downwardly---.
Column 14, line 45; delete "from".
Column 15, line 19; change "including" to ---includes---.
Column 15, line 52; after "to" insert ---each of---.
Column 15, line 62; change "to" to ---of---.
Column 16, line 28; change "oand" to ---and---.
Column 16, lines 36 and 37; change "receptacle" to
---receptacles---.
Column 16, line 45; change "including" to ---includes---.
Column 20, line 45; change "as" to ---so---.
Column 21, line 16; before "first" insert ---said---.
Column 21, line 52; after "36" insert a comma ---,---.
Column 22, line 2; after "a" insert ---first partition to a
second said terminal means as mounted on a---.
Column 24, line 8; after "means" insert ---and---.

Signed and Sealed this

Twenty-eighth Day of March 1978

[SEAL]

Attest:

RUTH C. MASON
Attesting Officer

LUTRELLE F. PARKER
Acting Commissioner of Patents and Trademarks